United States Patent [19]

Afzali-Ardakani et al.

[11] Patent Number: 4,554,562

[45] Date of Patent: Nov. 19, 1985

[54] SCRATCH RESISTANT RECORDING MATERIALS FOR ELECTROEROSION PRINTING NOT REQUIRING A LUBRICANT OVERCOAT

[75] Inventors: Ali Afzali-Ardakani, Katonah; Mitchell S. Cohen, Ossining; Keith S. Pennington, Somers; Krishna G. Sachdev, Wappingers Falls, all of N.Y.

[73] Assignee: International Business Machines Corporation, Armonk, N.Y.

[21] Appl. No.: 567,297

[22] Filed: Dec. 30, 1983

[51] Int. Cl.[4] .......................... G01D 15/34; B05D 5/12; B32B 7/00

[52] U.S. Cl. .......................... 346/135.1; 427/58; 427/121; 427/122; 427/123; 428/206; 428/323; 428/327; 428/421

[58] Field of Search .......................... 346/135.1; 428/422, 428/695, 206, 323, 327, 421; 430/49; 427/121, 58, 122, 123

[56] References Cited

U.S. PATENT DOCUMENTS

| | | | |
|---|---|---|---|
| 3,983,564 | 9/1976 | Nakazawa et al. | 346/1.1 |
| 4,212,923 | 7/1980 | Brady | 428/419 |
| 4,241,134 | 12/1980 | Burwasser | 428/331 X |
| 4,339,758 | 7/1982 | Bhatia et al. | 346/1.1 |
| 4,388,400 | 6/1983 | Tabei et al. | 430/346 |
| 4,400,706 | 8/1983 | Takemura et al. | 346/135.1 |
| 4,408,319 | 10/1983 | Tsunoda et al. | 369/275 X |
| 4,423,132 | 12/1983 | Kondo et al. | 430/67 X |

*Primary Examiner*—E. A. Goldberg
*Assistant Examiner*—Gerald E. Preston
*Attorney, Agent, or Firm*—George E. Clark; Jackson E. Stanland

[57] ABSTRACT

Electroerosion recording materials of superior scratch resistance are provided without the need for a lubricant overcoat by incorporating a hard, lubricating hydrophobic polymer layer between the support and the removable, thin conductive layer to reduce plastic deformation of the support under stylus writing pressure. The intermediate polymer layer provides a highly adhering surface for the overlying aluminum film and contains graphite fluoride and/or fluorocarbon resins such as Teflon® and hard particles such as silica. The materials may be used in various printing processes including making directly readable images, direct negatives and wear resistant offset printing masters.

61 Claims, 3 Drawing Figures

SCRATCH RESISTANT RECORDING MATERIALS FOR ELECTROEROSION PRINTING NOT REQUIRING A LUBRICANT OVERCOAT

FIELD OF THE INVENTION

The invention relates to electroerosion printing and to recording materials for use as human readable material and for use in the production of direct negatives and direct offset masters.

BACKGROUND ART

Electroerosion printing is a well-known technique for producing markings, such as letters, numbers, symbols, patterns, such as circuit patterns, or other legible or coded indicia on recording material in response to an electric signal which removes or erodes material from the surface of the recording material as the result of spark initiation (arcing).

The surface which is electrically eroded or removed to provided such indicia on the recording material is usually a thin film of conductive material which is vaporized in response to localized heating associated with sparking (arcing) initiated by applying an electric current to an electrode in contact with the surface of a recording material comprising the thin conductive film on a non-conductive backing or support. In the present state of the technology, the thin conductive film is usually a thin film of vaporizable metal, such as aluminum. In practice, a multi-styli print head is scanned across the aluminum surface of the recording medium and electrodes are selectively energized to form images in accordance with digitally coded image information. Electroerosion materials and processes are useful to produce directly, human readable images, photomasks, etc. For a number of such applications, flexible substrates of paper and plastic have been employed with thickness on the order of 2 to 5 mil with vapor deposited aluminum films of a thickness on the order of 0.5 to 5 micrometers having been utilized. For details on materials heretofore used in electroerosion printing, see U.S. Pat. No. 4,082,902, Suzuki, and U.S. Pat. No. 4,086,853, Figov.

In high resolution and high speed electroerosion printing, the print head used to record the desired information may be comprised of thirty or more styli which move in relation to the surface of specially prepared recording media. Electrical writing signals are fed to the stylus or styli to provide controlled electrical pulses which generate arcing at the surface of the recording material selectively to heat and remove by evaporation a layer, usually aluminum, of the recording material; the removed material corresponds to the indicia which are to be recorded.

A common problem with high resolution electroerosion printing processes using conventional metallized plastic substrates is that severe scratching of the aluminum layer occurs during writing. This may be attributable to the relatively low resistance of a thin aluminum film to mechanical abrasion or to other causes, including plastic deformation of the substrate. The thin conductive film, for example, the vapor-deposited thin aluminum film, apparently cannot withstand the high strains generated when the support or substrate is deformed, resulting in scratching. Also, in the instance that the styli cold-weld to the thin aluminum conductive layer, the structure may suffer shear, either at the aluminum-substrate interface or below it in the substrate itself.

Various measures have been proposed to combat the problem of scratching. For example, it has been suggested to suppress the plastic deformation of the substrate by creating a thin hard layer below the aluminum. The hardness of the layer would be selected to prevent the undesired deformation, but the thickness of the layer would be such that the gross flexibility of the sheet necessary for electroerosion writing and handling would be maintained. The method of obtaining this hard layer involves the incorporation of small hard particles, such as silica, in a suitable polymeric binder.

This system was found in fact to decrease scratching caused by the polymer-substrate deformation mechanism. Although such a base layer between the plastic substrate and the aluminum film provides substantial improvement in scratch resistance, some scratching still remains, caused by the fact that the hard particles in these coatings are easily abraded during the printing process due to high local pressure caused by the styli on such rough surfaces.

In the co-pending application Ser. No. 454,743, filed Dec. 30, 1982, expressly incorporated herein by reference, there is disclosed electroerosion recording materials comprising a non-conductive support, a thin layer of conductive material capable of being removed by evaporation during electroerosion recording and an improved intermediate layer of thin, hard cross-linked polymer between said support and said layer of conductive material. The cross-linked polymer layer, such as a thermoset cellulose-acetate-butyrate polymer (CAB) cross-linked with polyisocyanate, and containing hard particles such as silica, is found to reduce plastic deformation of the support in response to stylus writing pressure and thus minimizes scratching during the electroerosion process, while the surface roughness is sufficient to scour off from the stylus debris formed during electroerosion recording.

However, with the employment of either a noncross-linked polymer based or the above-described cross-linked polymer based intermediate layer, it has been necessary to include a lubricant overcoat to further improve the scratch-resistance and print quality of the electroerosion material. Lubricant coatings containing conductive particles of high lubricity, such as graphite, in a polymeric binder are disclosed in copending application Ser. No. 454,744, filed Dec. 30, 1982.

Although with the application of a lubricant overlayer and a relatively hard cross-linked base layer, it has been possible to obtain much better scratch resistance, further modifications of the chemistry of various coatings are desired for an overall improvement so as to obtain reduced head wear, and reduced "fouling" or "baking" problems which are caused by the accumulation of eroded debris on the print head during the writing process.

U.S. Pat. No. 3,740,254, Lansbury et al, describes an isocyanate-ended polyurethane composition, i.e., a prepolymer, as a primer for the deposition of thin aluminum films on various substates including plastic substrates. The purpose here is to improve adhesion of the aluminum film.

U.S. Pat. No. 3,786,518, Atherton, describes an electroerosion recording material comprising, for example, a thin conductive film of aluminum deposited over a resin which has been provided with a matte finish by the inclusion of a matting agent or by treating the resin surface. A wide variety of resinous materials is suggested for the resin layer.

U.S. Pat. No. 4,339,758 of Bhatia et al, describes an electrosensitive recording that uses a silicon dioxide containing resinous base layer between the support and the overlying metallic film.

SUMMARY OF THE INVENTION

In accordance with the present invention, it has been found that electroerosion recording materials having superior resistance to surface abrasion or scratching of the thin conductive film, such as aluminum, improved adhesion of aluminum to the base layer, marked reduction in the print head wear, reduced "fouling" and "baking," and an overall improvement in print quality can be produced by providing between the conductive film and the support a thin hydrophobic layer comprising graphite fluoride and/or fluorocarbon polymers such as the Teflon ® resins as solid lubricants and a hard particulate material such as silica, in a polymer binder, said layer having sufficient hardness to substantially eliminate scratching due to plastic deformation of the support without reducing the handling and writing qualities of the recording material. The recording material of this invention has a further advantage of process simplification since it does not require a lubricant overcoat and thus, eliminates the extra step of applying a lubricating overcoat that is needed in prior techniques as discussed hereinabove.

In one version of the present invention, the electroerosion recording material has a light transmissive intermediate layer comprising graphite fluoride and/or fluorocarbon resin as lubricants and white hard particulate material in a polymeric binder, thereby enabling the recording material to be used in preparing direct negatives and/or offset printing masters.

In another embodiment of the invention, the intermediate layer contains graphite fluoride and/or fluorocarbon resins such as 'Teflon' along with other solid lubricants such as graphite, and a hard particulate material such as silica in a polymeric binder. The incorporation of graphite fluoride and/or fluorocarbon resins in coating formulations for the intermediate layer has been found to markedly increase the adhesion of a conductive metal such as aluminum to the intermediate layer.

DETAILED DESCRIPTION OF THE INVENTION

Figure 1:
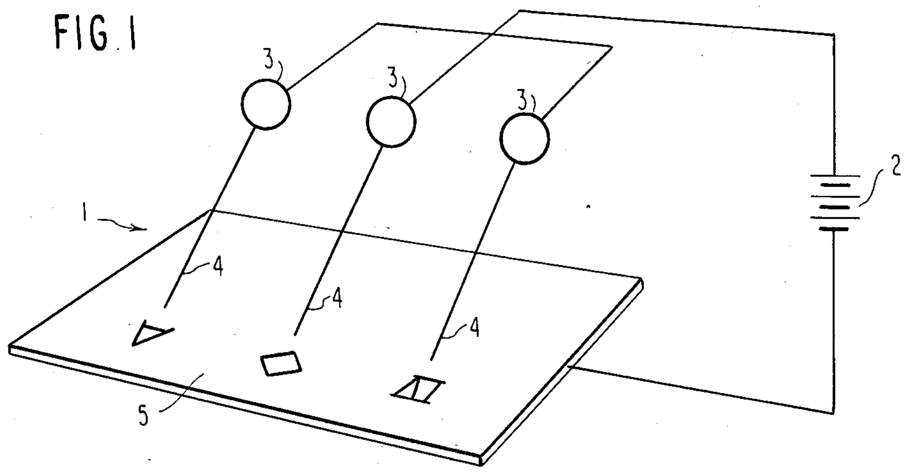
FIG. 1 of the drawings is a general schematic rendering of an illustrative electroerosion printing system.

The present invention is concerned with improvements in electroerosion recording materials and in particular such materials useful in the production of direct negative and offset printing masters.

In the broadest sense, the invention comprises the provision between the thin conductive film and the plastic support member, such as a polyester, e.g., Mylar ®, of a hard, lubricating, thermoset polymeric film or layer which reduces plastic deformation of the support member during electroerosion writing sufficiently so that abrasion of the thin conductive film, usually evaporated aluminum, is minimized. The hardness, thickness and asperities caused by inorganic fillers such as silica, of this intermediate layer are also selected so that the handling and writing characteristics of the recording material are not adversely affected. With the inclusion of graphite fluoride and/or fluorocarbon resins such as Teflon ® as a solid lubricant, there is improved adhesion of aluminum to the base layer and sufficient scratch resistance without the need for a lubricating overcoat. A lubricant overcoat is generally required where the intermediate layer does not contain graphite fluoride and/or fluorocarbon resins individually or in combination with other lubricants.

According to this invention, a superior hard, thin underlayer for a conductive metal layer is provided for electroerosion recording materials by inclusion of graphite fluoride and/or Teflon ® resin as micropowder available from duPont and a hard particulate material, preferably in a thermoset cross-linked polymer binder, as the underlayer.

Graphite fluorides such as the Fluorographite TM product of Ozark-Mahoning can be obtained in particle size of the order of 3–40 μm and can be employed either as a single solid lubricant component in the base layer coating composition or in combination with fluorocarbon resins and/or with essentially any laminar solid of high lubricity. Among the co-lubricant solids with graphite fluoride and/or fluorocarbon resins, the preferred material is graphite although other lamellar or conductive lubricant materials which are expected to be useful include, for example, $MoS_2$, $WS_2$, AgI, Sn, Cu, Ag, Pb, Bi, Al, Zn, etc. Non-conductive particulate lubricants that may be used in combination with Teflon ® resins and/or graphite fluoride include boron nitride and boric acid.

The hard particles are preferably $SiO_2$, but could be other materials known in the art, such as, titanium dioxide, zinc oxide, alumina, calcium carbonate, boron nitride, etc., having a size of about 0.5 to 10.0 μm. The $SiO_2$ pigment of a particle size of from about 0.5 to 10 microns, preferably about 1 to 5 microns, is preferred and should be added to the binder in the range of from about 2 to 25% by weight, based on the cured film. The silica particles act as a filler in the system to prevent blocking and also help to improve wear-resistance of the coating.

The lubricating particles are selected to be physically and chemically compatible with the heretofore described hard particle-binder systems. Thus, the lubricating particles of graphite fluoride will range in size from about 1 to 20 microns, preferably about 2 to 5 microns, and the Teflon ® micropowder resins are available from du Pont in particle size ranging from 0.5–5 microns.

When graphite fluoride is used as the sole or major lubricating particle, for example in the fabrication of the recording material, it can be used in an amount of about 0.5 to 5 weight percent, based on the cured film. On the other hand, when the graphite fluoride is employed in combination with other solid lubricants, a lesser amount of about 0.2 to 2 wt% can be conveniently employed, with the overall particulate lubricant content of the cured film being about 2 to 10% by weight. It is observed that graphite fluoride tends to phase separate such that it concentrates on the surface of the coating upon curing to cause spatial fixation of the graphite fluoride particles in the polymeric binder.

Graphite fluoride $(CF_x)_n$ such as the Fluorographite TM product of Ozark-Mahoning is available in a range of degrees of fluorination with coloration varying from black through grays to white with increasing fluorination. For example, Fluorographite TM having a degree of fluorination (x) of 0.25 is black, of 0.9 is light gray and about 1 is snow white. Fluorographite TM with x=0.4–0.5 can be used in providing a light transmissive base layer for use in direct negative and/or offset master applications, for example, in preparing a 5μ thick coating of urethane cross-linked CAB (cellulose-acetate-butyrate)silica-Fluorographite TM (x=0.4–0.5) on a Mylar ® sheet with a pigment-volume concentration (PVC) of silica and Fluorographite ® of 10 and 2.5, respectively, which has 83% light transmission.

On a PVC basis, the hard particles are present in a concentration of about 5 to 25, and the lubricant particles in a concentration of about 0.5 to 5. Where the grapite fluoride is being used primarily to aid in surface adhesion, its PVC in the intermediate layer can be about 0.2 to 1.5, with the remainder of particulate lubricant PVC being provided by other conductive or non-conductive lubricant particles When a fluorocarbon resin is used as the sole or the major lubricant particulate, it can be used in an amount of about 0.5 to 5 weight percent based on the total solids in the cured coatings. However, when such a resin is employed as a co-lubricant with graphite fluoride or other solid lubricants, a lesser amount of about 0.2 to 2 weight percent generally is sufficient to provide an overall improvement in the performance of the recording material according to this invention. Among a variety of fluorocarbon resins available, the Teflon ® resins available as micropowders in particle size of 0.5–5 micron from Du Pont, are the preferred materials to provide base layers having light transmissivity suitable for use in direct negative or direct offset-master applications.

The polymeric binder can be selected from the binders used in preparing hard cross-linked and non-cross-linked intermediate layers which can contain hard particles, as disclosed in the heretofore mentioned application Ser. No. 454,743. Thus, the polymeric binder can be selected from cellulose esters and ethers such as cellulose acetate butyrate (CAB), ethyl cellulose, nitrocellulose and cellulose acetate, or other polymers including polyvinylbutyral, novolak resins, epoxys, styryl allyl alcohol, etc. Where the desired or necessary, thermal, radiation-induced or chemical curing and/or cross-linking can be carried out.

Preferably, the polymeric binder forms a highly cross-linked polymer coating, and the following are representative examples of various cross-linked polymer systems for application according to this invention:

(a) Urethane cross-linked cellulosic coatings formed from cellulose derivatives and aromatic or aliphatic polyisocyanates in the presence of suitable dispersing agents, catalysts and wetting agents well known to those skilled in the polyurethane art. Suitable cellulose derived materials are: Cellulose acetate butyrate (CAB), ethyl cellulose (EC), nitrocellulose. cellulose acetate and cellulose diacetate, etc. Alternate materials containing unsubstituted hydroxyl groups for reaction with polyisocyanates to form cross-linked polyurethanes are: polyvinylbutyral, Bakelite phenoxy resins, phenolic resins, epoxies sych as Eponols and polyether glycols such as "Teracol" (from du Pont), and poly(styrylallyl alcohol). Typical polyisocyanates that react with available —OH groups of cellulosic binders or alternate systems include toluene diisocyanate, diphenylmethane diisocyanate, hexamethylene diisocyanate-based systems such as Desmodur N-75 (aliphatic prepolymer, Mobay Chemical Co.) and Mondur Resins such as CB-60 and CB-75, and Mondur HC. Melamine cross-linking agents can also be employed to obtain thermoset coatings with the above binders. Inorganic fillers such as $SiO_2$, alumina, $CaCO_3$, $TiO_2$ and calcium silicate, etc. of particle size ranging from 0.5 μm to 10 μm can be incorporated by the usual techniques of grinding or milling together with the binder, the urethane solvent such as MEK-Toluene mixture, and a suitable dispersing agent such as Multron R221-75, a saturated polyester resin by Mobay Chemicals.

The urethane forming reactions of the above-described binders and urethane prepolymers are catalyzed by organometallic reagents such as stannous oleate, stannous octoate, dibutyl-tin dioctoate, dibutyl-tin dilaurate, calcium or cobalt naphthenate and also tertiary amines. Further acceleration of the cross-linking reaction can be achieved by thermal treatment of the coatings.

(b) Cross-linked polymer coatings with beneficial properties can be obtained by the use of radiation curable acrylated polyurethane oligomers of the type "UVITHANE 783" and "UVITHANE 788" available from Thiokol Chemical Div. Inorganic fillers such as silica can be dispersed by conventional techniques prior to coating.

Highly cross-linked films can also be obtained by thermal or radiation-induced copolymerization/co-cross-linking of the above UV curable urethane oligomers with added multifunctional monomers such as pentaerythritol triacrylate (PETA) and trimethyololpropane triacrylate (TMPTA) available from Celanese Corporation.

(c) Desired cross-linked films can also be formed by thermal, microwave, or UV curing of coatings cast from blends of acrylated cellulosic derivatives and UV curable urethane oligomers described in (b) above.

While a number of materials and approaches, as described above, are suitable for hard polymer films to achieve superior quality electroerosion printing materials, we have found that excellent anti-abrasion properties and writing characteristics can be achieved by utilizing cellulose derived binders such as cellulose acetate butyrate or ethyl cellulose with polyisocyanates as cross-linking agents. The material may be used filled with silica particles plus the lubricant particles.

The intermediate layer should have a thickness of 2–10 micrometers.

The support or substrate is selected from those materials heretofore used in preparing the type of electroerosion recording material desired, for example, Mylar ® polyester, paper or polyolefin such as polypropylene.

The conductive recording layer, such as Al, can be applied by vacuum evaporation or sputtering, as known in the art. Desired resistivity is in the area of 1 to 5 ohms/cm$^2$.

In the preparation of offset masters, the intermediate layer is sufficiently hydrophobic to maintain good hydrophilic-hydrophobic mapping between the hydrophilic Al background and the hydrophobic written region due to exposed intermediate layer, when oleophilic inks are used in preparing copies from the offset master.

The detailed description of the invention can be better appreciated by reference to the accompanying drawings. FIG. 1 illustrates schematically an electroerosion printing system 1 which includes a source of electrical energy 2, which is connected with writing control means 3 for controlling the flow (voltage and pulse length) of electrical current to styli 4 which are electrodes which contact the surface of the electroerosion recording material 5.

In operation, electric current pulses corresponding to information to be printed on the recording material 5 are transmitted through the writing control systems 3 to the styli 4. As a result, electrical discharges are generated at the surface of the recording material 5, and the temperature of the thin surface film is locally raised, causing evaporation of the surface film or layer and exposing the underlying material to produce the desired image.

Means (not shown) are provided for moving the styli 4 relative to and in contact with the surface of the recording material 5. As the styli 4 move relative to the recording material 5 and the writing control means 3 direct pulses of current to the styli of sufficient voltage to cause arcing and evaporation of a conductive layer of the material, there can be recorded desired information, patterns and graphics of any kind.

Figure 2:
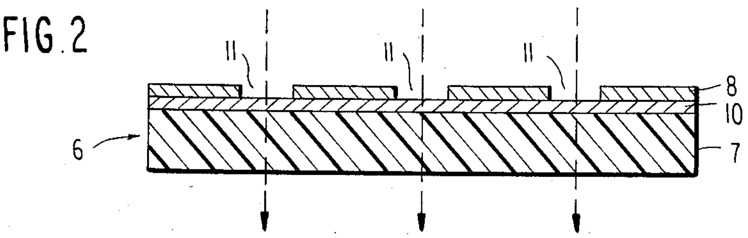
FIG. 2 of the drawings is a cross-sectional view of a direct negative made in accordance with this invention.
Figure 3:
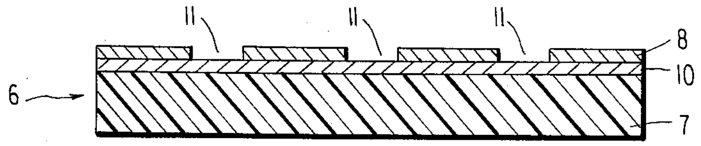
FIG. 3 of the drawings is a cross-sectional view of an offset master made in accordance with this invention.

Referring to FIGS. 2 and 3, the electroerosion recording material of this invention 6 is shown in cross section to comprise a support 7 of paper, polymer film, etc., a thin, conductive, evaporable layer or film 8, and a tough, hard film 10 containing lubricant particles and hard particles positioned between the support 7 and the evaporable layer 8. This intermediate film 10 is comprised of fluorocarbon resins and/or graphite fluoride as solid lubricants along with small hard particles such as silica in a suitable polymeric binder, for example, urethane cross-linked cellulose-acetate-butyrate (CAB) as disclosed in copending application Ser. No. 454,743. The intermediate layer serves to reduce scratching of the material during electroerosion printing to the extent that a lubricant top coat is not needed. The evaporable film 8 usually has a resistance from about 1 to 5 ohms per square centimeter and is frequently a vapor-deposited thin film of aluminum.

Where the backing or support is a light transparent or transmissive material and the intermediate layer is also transparent or light transmissive, the resulting product can be used as a photomask or direct-negative medium for the development of photosensitive materials, e.g., in the production of offset lithography masters, circuit boards, etc. Where the styli have been energized and the conductive film burned off light windows 11 are provided through the transparent backing so that the material is rendered selectively light (arrows) transmissive and may then be used in direct-photo-negative or like applications.

Where the material is to be used as an offset printing master as in FIG. 3, the intermediate layer 10 is chosen to be ink receptive. Imaging by electroerosion printing is carried out to selectively expose the intermediate layer. The conductive layer 8 must be ink repellent.

The following specific Examples are presented to illustrate the invention. All percentage and ratios are by weight unless otherwise set forth.

EXAMPLE 1

A mixture of 30 parts of 20% cellulose acetate butyrate (CAB) solution in 4:1 tetrahydrofurantoluene, 5.5 parts of amorphous silica (IMSILA-108H, available from Illinois Mineral Co., Illinois), 1 part of Fluorographite™ (OzarkMahoning, with degree of fluorination of 0.45–0.5), 0.3 parts of a polyester-polyol dispersing agent (R221-75, Mobay Chemical Co.) and 0.05 parts of a fluorocarbon surfactant (FC-430, 3M Co.), was ball milled for 24 hours to form a homogeneous dispersion (MILL BASE).

Coating Formulation

The Fluorographite™ containing MILL BASE, 10 parts, was mixed with 10 parts of a 20% CAB solution in 4:1 THF-toluene, 4.5 parts of polyisocyanate crosslinking agent (CB-75, Mobay Chemical Co.), 8 parts of a 4:1 THF-toluene mixture, 0.01 part of stannous octoate as the catalyst for the urethane forming reaction (T-9, from M&T Co.), and 0.01 parts of FC-430 surfactant. The mixture was agitated for 10 minutes and applied in a continuous casting process, by a conventional web coating technique, on the surface of a transparent Mylar™ polyester (polyethylene terephthalate) film, 2 mil thick, (XM-728, E. I. du Pont), followed by thermal treatment at 100° C. for 5–10 minutes to accelerate solvent evaporation and the polymer curing process to provide a coating layer of 5–6 micron dry thickness. Thereafter, a thin film of aluminum, about 250–400 Angstroms thick, as the electrically conductive layer was deposited over the base layer by vacuum evaporation at $10^{-6}$–$10^{-7}$ mmHg. The aluminum layer had electrical resistivity of 2–2.5 ohms per square centimeter. When this completed material was used for recording on a high speed electroerosion printer with a multistyli print head, excellent quality printing was observed with essentially no accumulation of the eroded debris on the print head even after hundreds of thousands of sweeps.

Head wear test results showed that the recording material of this invention causes a marked improvement in the wear life of the print head relative to a recording material prepared without the incorporation of graphite fluoride and/or fluorocarbon resins such as 'Teflon' micropowders in the base layer.

The printed material prepared according to this example was employed as a high quality direct negative and as an offset master using the standard water dampening-ink cycle on the printing press to generate more than 3,000 prints of excellent quality.

EXAMPLE 2

A mixture of 20 parts of a 20% CAB solution in 4:1 THF-toluene, 1.5 parts amorphous silica (IMSILA-108H), 0.15 parts of Fluorographite™ ($x=0.45$), 0.1 parts of dispersing agent (R221-75) and 0.02 parts of FC-430 surfactant, was ball milled for 16 hours to form a homogeneous dispersion. This was mixed with a solution of 4.1 parts of polyisocyanate crosslinking agent (CB-75, Mobay) in 8 parts of a 4:1 mixture of THF and toluene, along with 0.01 parts of T-9 as the catalyst. The mixture was stirred for 10 minutes and applied as described in Example 1 to form a 4–5 μm thick lubricant base layer. The electrically conductive film, aluminum at 250–400 Å thickness with electrical resistance of 2.5 ohms/square centimeter, was deposited by vacuum evaporation at $10^{-6}$–$10^{-8}$ mmHg. The recording material thus prepared was tested on a high speed electroerosion printer. Again, excellent print quality, high resolution with essentially no accumulation of eroded debris on the print head, and a marked improvement in the wear characteristics of the print head were realized.

EXAMPLE 3

A mixture of 10 parts of a 20% CAB solution in 4:1 THF-toluene, 1.0 part of amorphous silica, 0.1 part of Teflon® resin as a micropowder from du Pont, 0.05 part of a dispersing agent (R221-75) and 0.01 part of FC-430 surfactant, was ball milled for 16 hours to form a homogeneous dispersion. Prior to the coating application, the dispersion was thoroughly mixed with a solution of 1.5 parts of polyisocyanate cross-linking agent (Desmodur N-75 from Mobay Chemical Co.) in 3.5 parts of a 4:1 mixture of THF-toluene. The mixture was applied as described in Examples 1 and 2 to form 4–6 micron thick lubricant base layer. Thereafter, a thin film of aluminum, about 250–400 Å thick, was deposited over the base layer by vacuum evaporation. The aluminized recording medium thus prepared, upon printing on a high speed electroerosion printer, provided an excellent quality direct negative which was also employed as an offset master for making more than 5,000 copies of high quality on a printing press using the standard water dampening-ink cycle.

While the invention has been described in connection with certain preferred embodiments which have been demonstrated to be particularly effective, other adaptations and embodiments of the invention may be made by those of skill in the art without departing from the spirit of the invention or the scope of the following claims.

Having thus described our invention, what we claim as new, and desire to secure by Letters Patent is:

1. An electroerosion recording material comprising a non-conductive support, a thin layer of conductive material being evaporable in response to arcing and high local temperatures obtained in an electroerosion recording process, and an intermediate layer of thin, hard, hydrophobic polymer between said support and said layer of conductive material, said intermediate layer containing at least one of graphite fluoride and fluorocarbon polymers as solid lubricants spatially concentrated at the surface of said intermediate layer which contacts said thin conductive material, and a hard particulate material, the toughness of said intermediate layer being sufficient to reduce plastic deformation of said support in response to stylus writing pressure, and the surface roughness of said intermediate layer being sufficient to minimize scratching of said layer of conductive material during the electroerosion recording process, while still serving to scour off from the electroerosion stylus debris formed during electroerosion recording.

2. The recording material of claim 1 wherein said intermediate layer comprises a cross-linked polymer matrix.

3. The material of claim 1 wherein said conductive material is a thin film of aluminum.

4. The material of claim 1 wherein graphite fluoride is used as the solid lubricant.

5. The material of claim 1 wherein a fluorocarbon polymer is used as the solid lubricant.

6. The material of claim 1 wherein graphite fluoride and a fluorocarbon polymer are used in combination, as the solid lubricant.

7. The material of claim 1 wherein said hard particulate material is silica.

8. The material of claim 1 wherein said support and said intermediate layer are light transmissive such that, after electroerosion of the conductive member, the material may be utilized in direct-negative applications.

9. The material of claim 1 wherein the surface of said conductive material is hydrophilic and said material is used in direct offset master applications.

10. An electroerosion recording material comprising a non-conductive support, a thin layer of conductive material being evaporable in response to arcing and high local temperatures obtained in an electroerosion recording process, and an intermediate layer of thin, hard polymer between said support and said layer of conductive material, said intermediate layer containing less than about 5% by weight of at least one of graphite fluoride and fluorocarbon polymers as solid lubricants, spatially fixed in a thin surface region of said intermediate layer and a hard particulate material, the toughness of said intermediate layer being sufficient to reduce plastic deformation of said support in response to stylus writing pressure, and the surface roughness of said intermediate layer being sufficient to minimize scratching of said layer of conductive material during the electroerosion recording process, while still serving to scour off from the electroerosion stylus debris formed during electroerosion recording.

11. The recording material of claim 10 wherein said intermediate layer comprises a cross-linked polymer matrix.

12. The recording material of claim 10 wherein said intermediate layer contains a co-lubricant solid.

13. The recording material of claim 12 wherein said co-lubricant solid is graphite.

14. The recording material of claim 10 wherein said conductive material is a thin film of aluminum.

15. The recording material of claim 10 wherein graphite fluoride is used as the solid lubricant.

16. The recording material of claim 10 wherein a fluorocarbon polymer is used as the solid lubricant.

17. The recording material of claim 10 wherein grapite fluoride and a fluorocarbon polymer are used in combination as the solid lubricant.

18. An electroerosion recording material, comprising:

a support layer, an intermediate layer in contact with said support layer, said intermediate layer protecting said support layer from plastic deformation during electroerosion recording, a thin layer of conductive material of said intermediate layer, said thin layer of conductive material being erodable in response to electrical signals applied to a plurality of recording styli which contact said thin layer of conductive material, wherein said intermediate layer is comprised of a thin, hard polymer including a solid lubricant spatially fixed at the surface of said intermediate layer adjacent to said thin conductive material, said spatially fixed lubricant reducing styli water and fouling during electroerosion recording and enhancing the adhesion between said thin layer of conductive material and said intermediate layer.

19. The recording material of claim 18, wherein said spatially fixed lubricant is selected from the group consisting of graphite fluoride and fluorocarbon polymers.

20. The recording material of claim 18 wherein said spatially fixed lubricant is present in an amount less than approximately 5% of said intermediate layer.

21. The recording material of claim 18, where said spatially fixed lubricant includes at least one of graphite fluoride and fluorocarbon polymers and a solid co-lubricant, the total amount of solid lubricants in said intermediate layer being less than approximately 10%, by weight, of said intermediate layer.

22. The recording material of claim 18, where said spatially fixed solid lubricant is 'Teflon'.

23. The recording material of claim 18, where said intermediate layer further includes a hard, particulate material.

24. The recording material of claim 23, where said intermediate layer further includes a cross-linked polymer.

25. The recording material of claim 18, where said spatially fixed solid lubricant is graphite fluoride.

26. The recording material of claim 18, where said spatially fixed solid lubricant is a fluorocarbon polymer.

27. The recording material of claim 18, further including graphite.

28. The recording material of claim 18, where said thin layer of conductive material is comprised of aluminum.

29. In an electroerosion material including a multilayered structure comprised of a support member, a thin layer of conductive material which is erodable in response to arcing in high local temperatures obtained in an electroerosion recording process, and an intermediate layer located between said thin layer of conductive material and said support, the improvement wherein said intermediate layer is comprised of a first, more thick region adjacent to said support said first region comprising a hard polymer including particulate manner, and a second, very thin region located adjacent to said thin layer of conductive material, said second region including a solid lubricant phase-separated from said first region and concentrated adjacent to said thin layer of conductive material, said solid lubricant being present in an amount less than approximately 5%, by weight, of said intermediate layer.

30. The electroerosion recording material of claim 29, where said solid lubricant is selected from at least one of the group consisting of graphite fluoride and fluorocarbon polymers.

31. The recording material of claim 29, where said solid lubricant is 'Teflon'.

32. The recording material of claim 29, where said thin conductive material is aluminum.

33. The recording material of claim 29 where said first region in said intermediate layer is comprised of a cross-linked polymer.

34. The recording material of claim 29, where said intermediate layer further includes graphite.

35. The recording material of claim 29, where said phase-separated solid lubricant is at least one of the group consisting of graphite fluoride and fluorocarbon polymers, said hard polymer is a cross-linked polymer, said thin conductive layer is aluminum, and said particulate material is silica.

36. The recording material of claim 35, where said phase-separated solid lubricant in said second region of said intermediate layer is present in an amount less than approximately 5%, by weight, of the intermediate layer constituents.

37. A method for making an electroerosion recording material comprised of a support layer, a thin layer of conductive material which can be eroded during an electroerosion recording process, and an intermediate layer between said thin layer of conductive material and said support layer, said intermediate layer reducing plastic deformation of said support layer during electroerosion recording and reducing fouling and wearing of a plurality of styli used in said electroerosion recording process, said method including the steps of forming said intermediate layer on said support layer, said intermediate layer being comprised of a hard polymer having dispersed therein a solid lubricant which is phase-separable in said hard polymer, and phase-separating said solid lubricant to concentrate said solid lubricant on the surface of said intermediate layer adjacent to said thin layer of conductive material, the total amount of said phase-separable solid lubricant being less than approximately 5%, by weight, of said intermediate layer.

38. The method of claim 37, where said hard polymer is a cross-linked polymer.

39. The method of claim 38, where said thin conductive layer is comprised of aluminum.

40. The method of claim 39, where said intermediate layer includes a hard, particulate material.

41. The method of claim 40, where said particulate material is silica.

42. The method of claim 37, where said phase-separable solid lubricant is at least one of the group consisting of graphite fluoride and fluorocarbon resins.

43. The method of claim 42, where said intermediate layer also includes graphite.

44. The method of claim 37, where said phase-separable solid lubricant is 'Teflon'.

45. The method of claim 44, where said hard polymer is a cross-linked polymer and wherein said intermediate layer also includes silica.

46. A method for forming electroerosion recording material, including the steps of:

forming an intermediate layer on a support layer, said intemediate layer being composed of a hard polymer having dispersed therein a particulate material, said intermediate layer further including a solid material which will separate from said hard polymer and concentrate at the surface of said intermediate layer remote from said support layer, said solid material having superior mechanical and thermal properties during electroerosion recording, forming a thin conductive layer on said intermediate layer, said thin conductive layer being eroded at selected portions thereof during said electroerosion recording, wherein said electroerosion recording occurs during the passage of electrical signals through a plurality of electrical styli which contact said thin conductive layer in said selected portions, said solid material concentrated at the surface of said intermediate layer and reducing styli wear and fouling during said electroerosion recording.

47. The method of claim 46, wherein said solid material is at least one of graphite fluoride and a fluorocarbon polymer.

48. The method of claim 46, where said solid material is 'Teflon'.

49. The method of claim 48, where said thin conductive layer is aluminum.

50. The method of claim 47, where said intermediate layer also includes a hard particulate material.

51. The method of claim 47, where said solid material is softer than the hard polymer comprising said intermediate layer.

52. The method of claim 51, where said intermediate layer also includes graphite.

53. An electroerosion recording material comprising a thin conductive layer which is erodable when contacted by a plurality of styli through which electrical signals pass during an electroerosion recording process, a support layer, and an intermediate layer located between said support layer and said thin conductive layer, said intermediate layer being comprised of a first region contacting said support layer, said first region being comprised of a hard polymer and a particulate matter filler and substantially reducing plastic deformation of said support layer during electroerosion recording, said intermediate layer including a second region much thinner than said first region and being located on the surface of said intermediate layer adjacent to said thin conductive layer, said second region being comprised of a material having superior mechanical and thermal properties and being softer than said hard polymer, said solid material being present in said intermediate layer in an amount sufficiently low that the desired hardness of said intermediate layer first region is not adversely affected.

54. The recording material of claim 53, where said solid material is present in amount less than approximately 5%, by weight, of said intermediate layer.

55. The recording material of claim 54, where said solid material is at least one of the group consisting of graphite fluoride and fluorocarbon polymers.

56. The recording material of claim 54, where said solid material is 'Teflon'.

57. The recording material of claim 56, where said intermediate layer also includes graphite.

58. The recording material of claim 55, where said hard polymer is cross-linked.

59. The recording material of claim 54, where said solid material has lubricating properties and is phase-separable in said intermediate layer.

60. An electroerosion recording material comprising, in combination, a thin conductive layer which is erodable when contacted by a plurality of styli through which electrical signals pass during electroerosion recording, a support layer, and an intermediate layer located between said support layer and said thin conductive layer, said intermediate layer including a hard polymer and a particulate material, and further including at least one of graphite fluoride and fluorocarbon polymers in an amount less than 5%, by weight, of said intermediate layer.

61. An electroerosion recording material comprising, in combination, a thin conductive layer which is erodable when contacted by a plurality of styli through which electrical signals pass during electroerosion recording, a support layer, and an intermediate layer located between said support layer and said thin conductive layer, said intermediate layer including a hard polymer and a particulate material, and further including 'Teflon' in an amount less than 5%, by weight, of said intermediate layer.

* * * * *